(12) United States Patent
Agata

(10) Patent No.: US 8,749,833 B2
(45) Date of Patent: Jun. 10, 2014

(54) PRINT PROGRAM, PRINT CONTROL APPARATUS AND IMAGE FORMING APPARATUS

(75) Inventor: Toshinori Agata, Fukushima (JP)

(73) Assignee: Oki Data Corporation, Tokyo (JP)

( * ) Notice: Subject to any disclaimer, the term of this patent is extended or adjusted under 35 U.S.C. 154(b) by 602 days.

(21) Appl. No.: 12/813,942

(22) Filed: Jun. 11, 2010

(65) Prior Publication Data

US 2010/0315656 A1 Dec. 16, 2010

(30) Foreign Application Priority Data

Jun. 12, 2009 (JP) .................................. 2009-140845

(51) Int. Cl.
G06K 15/02 (2006.01)

(52) U.S. Cl.
USPC ............................................................. 358/1.2

(58) Field of Classification Search
None
See application file for complete search history.

(56) References Cited

U.S. PATENT DOCUMENTS

| 8,279,482 | B2 * | 10/2012 | Tomizuka et al. ........... | 358/1.16 |
| 8,339,654 | B2 * | 12/2012 | Kurihara ...................... | 358/1.18 |
| 2002/0051205 | A1 | 5/2002 | Teranishi et al. | |
| 2003/0160977 | A1 * | 8/2003 | Nishikawa et al. ........... | 358/1.2 |

FOREIGN PATENT DOCUMENTS

| EP | 0895182 A2 | 2/1999 |
| JP | 9307739 A | 11/1997 |
| JP | 11-212749 A | 8/1999 |
| JP | 2000-335039 A | 12/2000 |
| JP | 2007235345 A | 9/2007 |

OTHER PUBLICATIONS

European Search Report for EP 2264589, published Jan. 23, 2013, 3 pages.

* cited by examiner

*Primary Examiner* — Vincent Rudolph
*Assistant Examiner* — John Wallace
(74) *Attorney, Agent, or Firm* — Panitch Schwarze Belisario & Nadel LLP

(57) ABSTRACT

In the case to print an image of a set page that sets a plurality of combine pages, it is possible to adjust an arrangement position of the combine pages without changing the direction of the combine pages and raising a reduction rate. In the print section, a reduction rate selection scene display section 110 is configured to display a selection scene for selecting a vertical sheet number and a horizontal sheet number of the combine pages arranged in the set page on a displaying section 40; an image forming and processing section 120 generates combine pages in a reduction rate that is selected by the reduction rate selection scene display section 110; and a set page generation section 130 generates a set page by arranging the combine pages.

14 Claims, 11 Drawing Sheets

COMBINE PAGE      COMBINE PAGE

REDUCTION RATE 1 / 4

SET PAGE

|   | 0 | 1 | 2 | 3 |
|---|---|---|---|---|
| 0 | p 0 | p 1 | p 2 | p 3 |
| 1 | p 4 | p 5 | p 6 | p 7 |
| 2 | p 8 | p 9 | p10 | p11 |
| 3 | p12 | p13 | p14 | p15 |

*FIG. 9E*

|   | 0 | 1 | 2 |
|---|---|---|---|
| 0 | p 0 | p 1 | p 2 |
| 1 | p 3 | p 4 | p 5 |
| 2 | p 6 | p 7 | p 8 |
| 3 | p 9 | p10 | p11 |
| 4 | p12 | p13 | p14 |
| 5 | p15 | p16 | p17 |

*FIG. 9F*

PRINT PROGRAM, PRINT CONTROL APPARATUS AND IMAGE FORMING APPARATUS

FIELD OF THE INVENTION

The invention relates to a print program, a print control apparatus and an image forming apparatus.

BACKGROUND OF THE INVENTION

Until now, in a compound machine that installs a printer section and a scanner section such as a printer, a duplicator, a facsimile apparatus, a scanner apparatus, a MET and the like, or in other image forming apparatus, N-up print is performed that allots a plurality of logical pages to one physical page. In the case to perform the N-up print, usually, N-page logical pages are reduced through dividing the physical page to N equally, and are allotted to a one Nth-page physical region through performing rotation process depending on the situation.

Patent document 1: Japan patent publication of No. 2000-335039 (Paragraph 0004~0009)

Here, usually, if direction of paper of a physical page is vertical set (portrait), a physical page region divided to N is also vertical set; and if direction of paper of a physical page is horizontal set (landscape), a physical page region divided to N is also horizontal set. If direction of paper of a logical page is unified as portrait or landscape, it is possible to perform N-up print without problems through the former image forming apparatus.

However, when the portrait and the landscape are intermingled in the direction of paper of the logical page, it is necessary to allot page of any one direction of the logical pages by performing rotation process of 90° and adjusting the direction of the physical region divided to N, or to allot logical page of landscape in the physical page region of the portrait divided to N, or to allot logical page of portrait in the physical page region of the landscape divided to N, by further raising a reduction rate without rotating. When the logical page is rotated 90°, there is image of portrait and landscape on the physical page (set page); On the other hand, when the reduction rate of the logical page (combine page) is further raised, the logical page is allotted by dividing the physical page to N, and image is further reduced, therefore there is a problem that readability of any one becomes low.

SUMMARY OF THE INVENTION

It is, therefore, an object of the invention to provide a print program, a print control apparatus and an image forming apparatus to solve the above problem. In the case to print an image of set page that sets a plurality of combine pages, even if the combine pages of vertical setting and horizontal setting are intermingled in a print document, it is possible to print the image of the set page that sets the plurality of combine pages without lowering the readability. That is, a first aspect of the invention is to provide a print program that is configured to realize a print section in a computer for printing an image of a set page that sets a plurality of combine pages in a print apparatus, wherein the print section comprises: a reduction rate selection scene display section that is configured to display a selection scene for selecting a vertical sheet number and a horizontal sheet number of the combine pages arranged in the set page on a displaying section; an image forming and processing section that reduces a plurality of source images in a reduction rate on the basis of the selected sheet numbers through the reduction rate selection scene display section and generates the plurality of combine pages; a set page generation section that generates a set page by arranging the plurality of combine pages; and a print output section that outputs image information of the combine pages to the printing apparatus, and the set page generation section arranges respective combine pages in region of a plurality of continuous combine pages by adjusting direction of the respective combine pages in the case that pages whose directions are different are contained in the plurality of combine pages.

A second aspect of the invention is to provide a print control apparatus that is configured to print an image of set page that sets a plurality of combine pages in a print apparatus, comprising: an image data making section that makes a plurality of image data; a drawing function change section that changes a graphics drawing function of the image data into a form corresponding to an output device; a reduction rate selection scene display sections that is configured to display a selection scene for selecting a vertical sheet number and a horizontal sheet number of the combine pages arranged in the set page on a displaying section; an image forming and processing section that reduces the respective image data in a reduction rate on the basis of the selected sheet numbers through the reduction rate selection scene display section and generates the plurality of combine pages from the plurality of image data; a set page generation section, in the case to arrange the combine page in a page arrangement region on the set page calculated by the arrangement data calculations, when direction of the page arrangement region on the set page is different from direction of the page arrangement region on the set page, that makes the reduction rate of the combine page as twice, arranges the combine page in a page arrangement region of two neighboring region parts calculated by the arrangement data calculation section, and generates a set page; and a print output section that outputs the set page to the print apparatus through a communicating section.

A third aspect of the invention is to provide an image forming apparatus that forms an image of a set page setting a plurality of combine pages, comprising: an inputting section that inputs a vertical sheet number and a horizontal sheet number of the combine pages arranged in the set page; an image generating and processing section that reduces source images in a reduction rate on the basis of the sheet number selected by the inputting section, and generates a combine page from the source images; a set page generation section, in the case to arrange the combine page in a page arrangement region on the set page calculated by the arrangement data calculations, when direction of the page arrangement region on the set page is different from direction of the page arrangement region on the set page, that makes the reduction rate of the combine page as twice, arranges the combine page in a page arrangement region of two neighboring region parts calculated by the arrangement data calculation section, and generates a set page; and an image forming section that forms an image of the set page generated by the set page generation section on the medium.

The Effect of the Present Invention

According to the present invention, in the case to print an image of set page that sets a plurality of combine pages, an arrangement position of the set page is adjusted without changing the direction of the combine pages and raising a reduction rate. Therefore, even if the combine pages of vertical setting and horizontal setting are intermingled in a print document, it is possible to print the image of the set page that sets the plurality of combine pages without lowering the readability.

The above and other objects and features of the present invention will become apparent from the following detailed description and the appended claims with reference to the accompanying drawings.

BRIEF DESCRIPTION OF THE DRAWINGS

FIG. 9E is a diagram showing a relation between a direction of a combine page and a direction of a page arrangement region in set page;

FIG. 9F is a diagram showing a relation between a direction of a combine page and a direction of a page arrangement region in set page.

DETAILED DESCRIPTION OF THE PREFERRED EMBODIMENTS

Embodiments of the invention will be described in detail hereinbelow with reference to the drawings.

Print System in Embodiment 1

Figure 1:
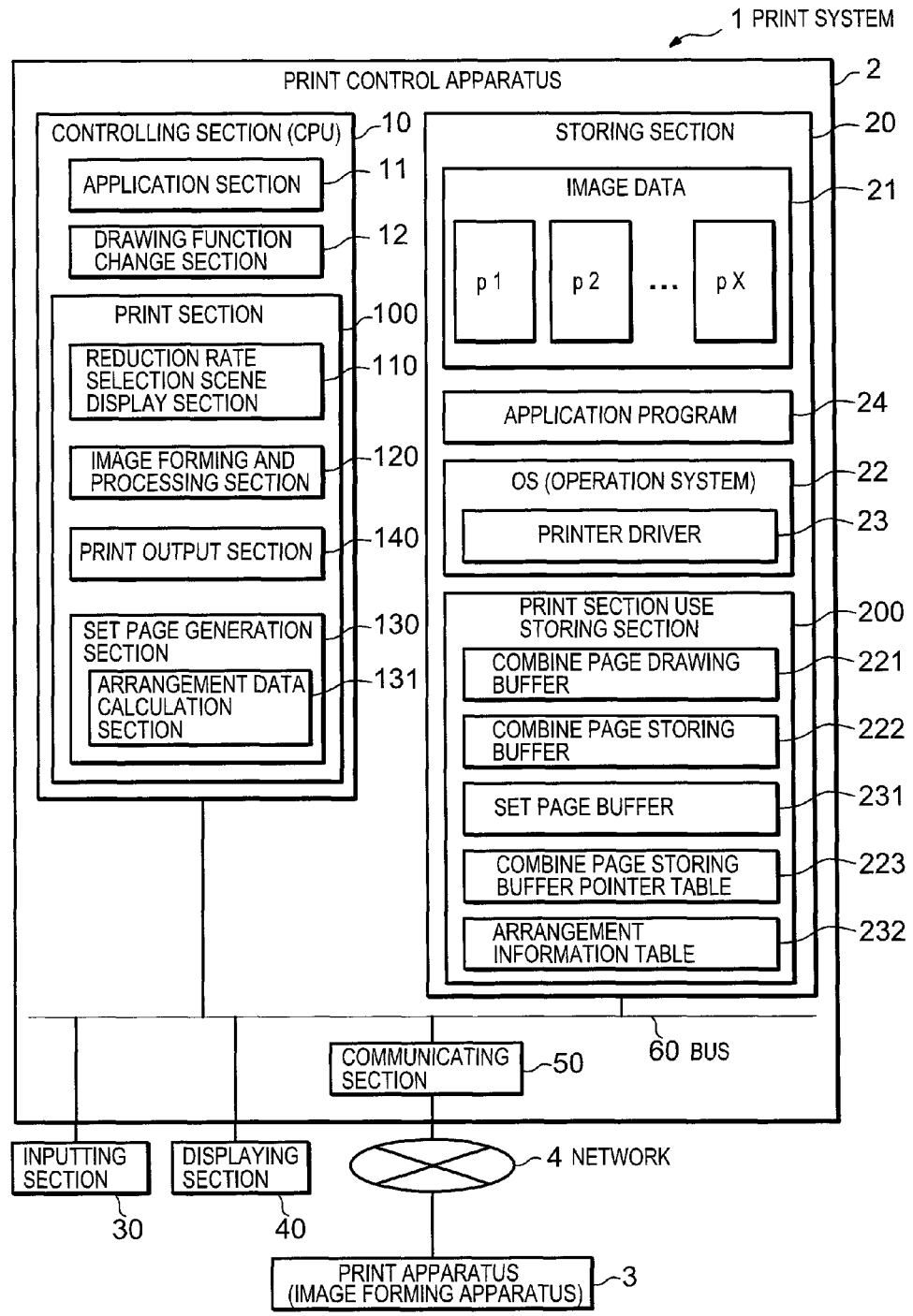
FIG. 1 is a structural diagram showing a print system in a first embodiment of the present invention.

FIG. 1 is a structural diagram showing a print system 1 in a first embodiment of the present invention.

The print system 1 is connected to a print control apparatus 2 and a print apparatus 3 through a network 4. The print control apparatus 2 has a controlling section 10, a storing section 20 and a communicating section 50, those are mutually connected through a bus 60, and is connected with an inputting section 30 and a displaying section 40. The print control apparatus 2 may be a general personal computer.

The inputting section 30 is, for example, keyboard, mouse and the like. The displaying section 40 is a display, for example, such as LCD and the like. The communicating section 50 is, for example, a network card. The print apparatus 3 as an image forming apparatus is, for example, a printer.

Next, it is to simply explain about respective parts of the print control apparatus 2 that forms the print system 1. The details will be explained in operation of the print control apparatus 2 mentioned later.

In the storing section 20, an application program 24, an operating system 22, a printer driver 23 and image data 21 are stored.

The application program 24 is, for example, general document making software, drawing making software and the like. The operating system 22 is software that manages computer system and supplies a basic user operation environment. The printer driver 23 is software for controlling a printer. Further, in the storing section 20, a print section use storing section 200 is stored. The print section use storing section 200 is a work region in the storing section 20 that is used in the case to realize a print section 100 mentioned later.

The image data 21 is data that becomes a source of image that is printed by the print apparatus 3, and is stored in every page. The image data 21, in the present embodiment, is stored in the storing section 20, but may also be stored in a mobile storing medium such as CD-ROM, MO and the like (not shown) to store in the print control apparatus 2 depending on the situation, or may also be stored in other personal computer, file server and the like (not shown) to obtain from them through the network 4 depending on the situation.

The controlling section 10 has an application section 11, a drawing function change section 12 and the print section 100, and the print section 100 comprises a reduction rate selection scene display section 110, an image forming and processing section 120, a set page generation section 130, an arrangement data calculation section 131 and a print output section 140.

The application section 11 is realized through starting the application program 24 stored in the storing section on the OS 22. Similarly, the drawing function change section 12 is realized through starting a GDI (Graphic Device Interface) (not shown) on the OS 22, and the print section 100 is realized through starting the printer driver 23 on the OS 22.

The application section 11 makes a graphics drawing function as the image data 21, and transmits the image data 21 to the drawing function change section 12.

The drawing function change section 12 changes the graphics drawing function as the image data 21 into a form corresponding to an output device such as the print apparatus 3 and the like, and transmits the image data 21 to the print section 100.

The print section 100 uses the reduction rate selection scene display section 110, the image forming and processing section 120, the set page generation section 130 and the print output section 140, generates print data (not shown) for printing by the print apparatus 3 from the image data 21, and sends the print data to the print apparatus 3.

The reduction rate selection scene display section 110 displays a selection scene 400 (referring to FIG. 3) that selects a vertical sheet number and a horizontal sheet number of the combine pages that are arranged in the set page and selects a direction of the print data, and makes user select a sheet number of the combine pages through the inputting section 30.

The image forming and processing section 120 calculates a reduction rate of respective image data 21 on the basis of the sheet number of the combine pages that are selected through the reduction rate selection scene display section 110.

Further, the image forming and processing section 120, through using a combine page drawing buffer (first storing section) 221, a combine page storing buffer (second storing section) 222 and a combine page storing buffer pointer table 223, performs a process about respective image data that generates one sheet of combine page reduced from one sheet of image data 21 on the basis of the calculated reduction rate.

The combine page drawing buffer (first storing section) 221 is used only for generating a combine page from the image data 21 through the image forming and processing section 120. The combine pages stored in the combine page drawing buffer (first storing section) 221, after transferred to the combine page storing buffer (second storing section) 222, are deleted from the combine page drawing buffer 221.

The combine page storing buffer (second storing section) 222 stores a plurality of combine pages that are generated by the image forming and processing section 120. Moreover, addresses of respective combine pages in the storing section 20 are stored in the combine page storing buffer pointer table 223. That is, the combine page storing buffer pointer table 223 is an index of the combine page storing buffer (second storing section) 222.

The set page generation section 130, through using the arrangement data calculation section 131, a set page buffer (third storing section) 231 and an arrangement information table 232, performs a process about the generated combine pages that generates one sheet of set page by combining a plurality of sheets of combine pages generated by the image forming and processing section 120.

The arrangement data calculation section 131 calculates an arrangement position of respective combine pages on the set page. The calculated arrangement position is stored in the arrangement information table 232.

The arrangement information table 232 stores the arrangement position on the set page and a page number of the combine pages that are arranged on the corresponding position (referring to FIG. 6).

The set page buffer (third storing section) 231 stores a set page that is generated by the arrangement data calculation section 131.

The print output section 140 outputs the plurality of set pages that are generated by the set page generation section 130 to the print apparatus 3 as print data through the communicating section 50.

Operation of Print Control Apparatus 2 in Embodiment 1

Figure 2:
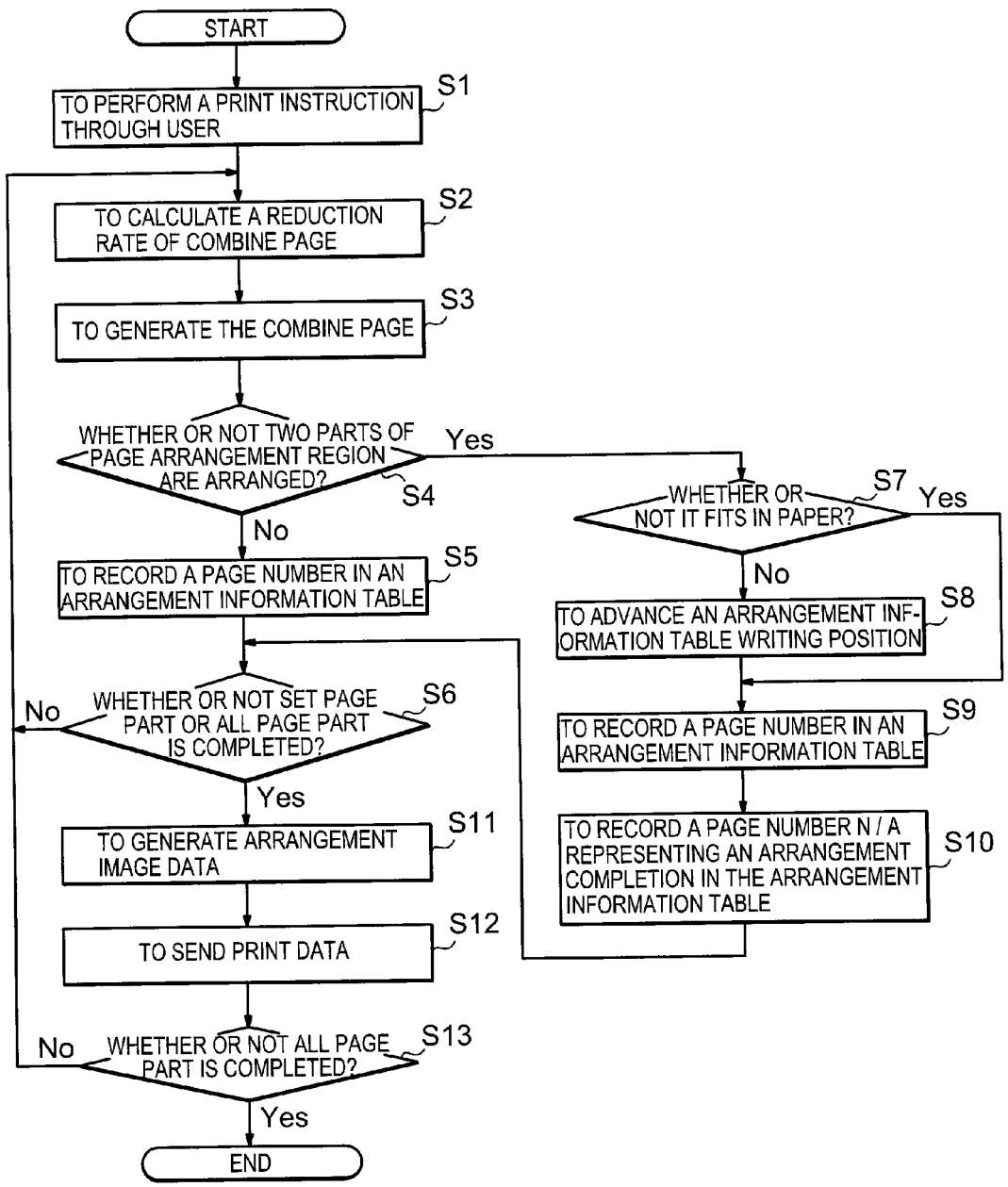
FIG. 2 is a flow chart for explaining operation of a print control apparatus in a first embodiment of the present invention.

By referring to the flow chart of FIG. 2, it is to explain operation of the print control apparatus 2 in the first embodiment. Here, it is to explain case in which the application section 11 generates the image data 21.

(Step S1)

The print control apparatus 2 starts a process through a print instruct by user. Firstly, the reduction rate selection scene display section 110 made the displaying section display the selection scene 400 shown by FIG. 3.

Figure 3:
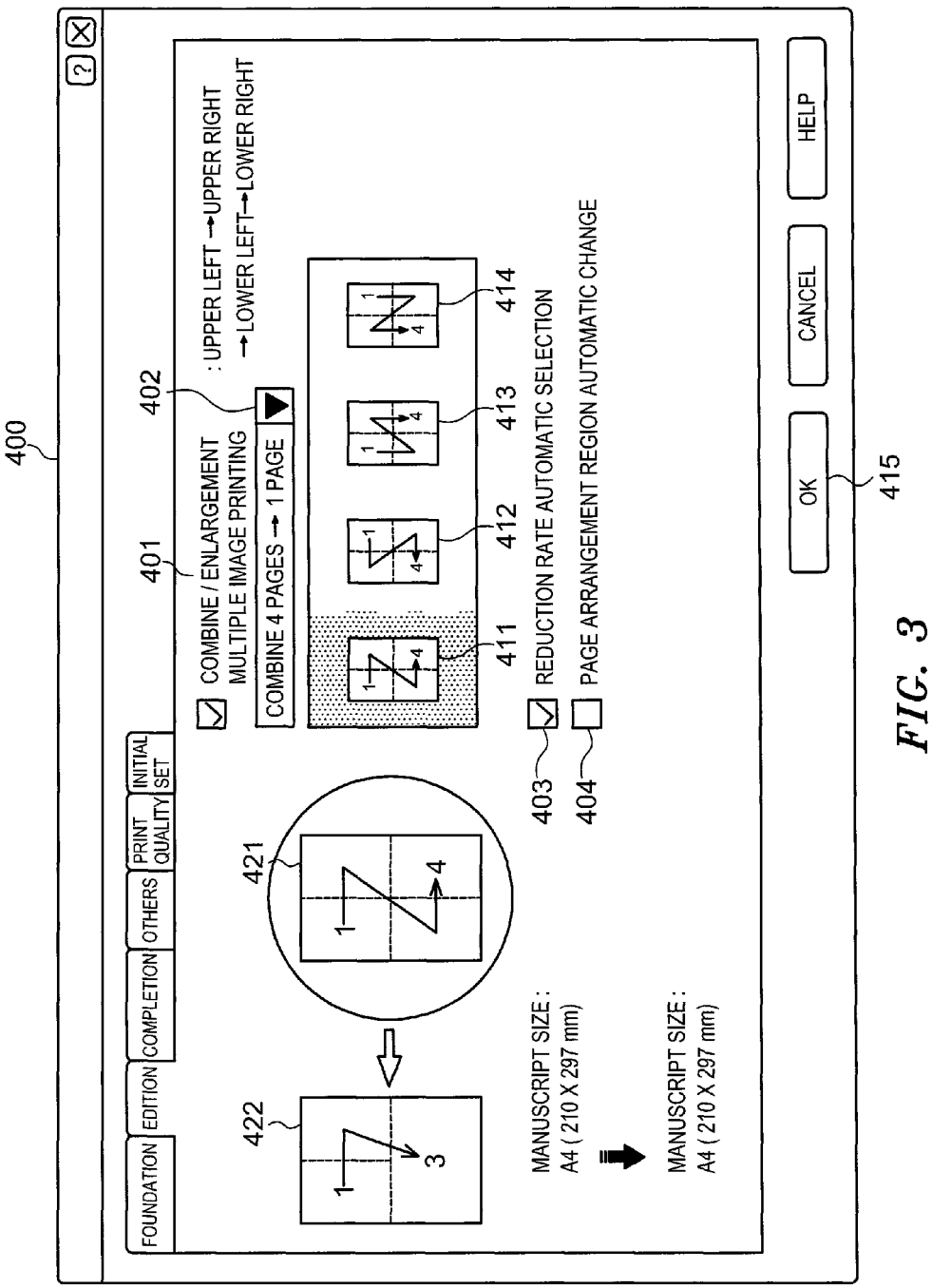
FIG. 3 is an explanation diagram of a selection scene 400 in which a reduction rate selection scene display section of print control apparatus is displayed in a first embodiment of the present invention.

User performs a check in a combine/enlargement multiple image printing check box 401, and selects an up number among a combine/enlargement multiple image printing tab 402. FIG. 3 shows a condition selecting 4-up print (that is, a print process combining 4 pages into 1 page). Next, user selects a printing order on the set page among print images 411~414. FIG. 3 shows a condition selecting upper left→upper right→lower left→lower right. Next, user performs a check in a reduction rate automatic selection check box 403. Thus, a print image 421 is changed into a print image 422.

Then, through performing a final print instruction by pressing a "OK" button 415 through user, the application section 11 transmits a graphics drawing function as the image data 21 to the drawing function change section 12 by dividing in every page. Here, the image data 21 is made in the application section 11, and is stored in the storing section 20. Next, the drawing function change section 12 changes the graphics drawing function as the image data 21 into a form corresponding to an output device such as the print apparatus 3 and the like, and transmits the image data 21 to the print section 100.

Furthermore, the print section 100, on the basis of the up number that is selected on the selection scene 400 of FIG. 3, recognizes a horizontal sheet number X and a vertical sheet number Y of the combine pages that are arranged in the set page, guarantees storing regions of the combine page storing buffer 222, the combine page storing buffer pointer table 223, the set page buffer 231 and the arrangement information table 232 on the basis of the value of X and the value of Y, and regards pointers and buffer counters of respective tables as 0.

(Step S2)

The image forming and processing section 120 calculates a reduction rate of the combine pages from sheet number X in which the combine pages are horizontally arranged and sheet number Y in which the combine pages are vertically arranged. Here, by serving a case in which the direction of the set page is portrait with X=2 and Y=2, it is to respectively explain a former reduction rate calculation means by referring to FIG. 4, furthermore, to explain a reduction rate calculation section of the present embodiment by referring to FIG. 5.

Figure 4A:
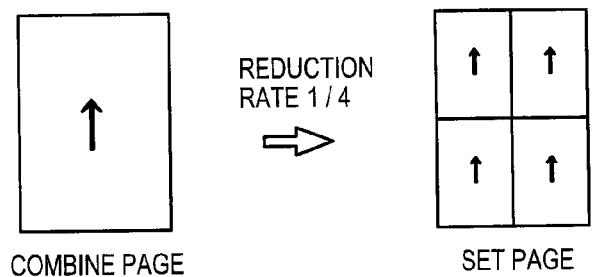
FIG. 4A is an explanation diagram of a former reduction rate calculation means.
Figure 4B:
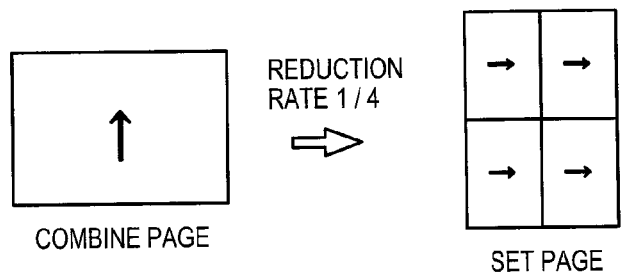
FIG. 4B is an explanation diagram of a former reduction rate calculation means.

Next, it is to explain a former reduction rate calculation means by referring to FIG. 4. The arrow in FIG. 4 represents a direction of the combine page on the combine page and the set page, the page in which the arrow is parallel with long side represents portrait as shown by FIG. 4A, and the page in which the arrow is parallel with short side represents landscape as shown by FIG. 4B.

As shown by FIG. 4A, if the direction of all the combine pages that are arranged in one sheet of set page is portrait, by serving the reduction rate of the combine page as ¼, it is possible to arrange by adjusting the direction of all the combine pages on the set page.

As shown by FIG. 4B, if the direction of all the combine pages that are arranged in one sheet of set page is landscape, because it is rotated 90° by serving the reduction rate of the combine page as ¼, it is possible to arrange by adjusting the direction of all the combine pages on the set page. However, in the case that the front and back set pages are the pages shown by FIG. 4A, there is a problem that the direction of the combine pages is different in every set pages.

Figure 4C:
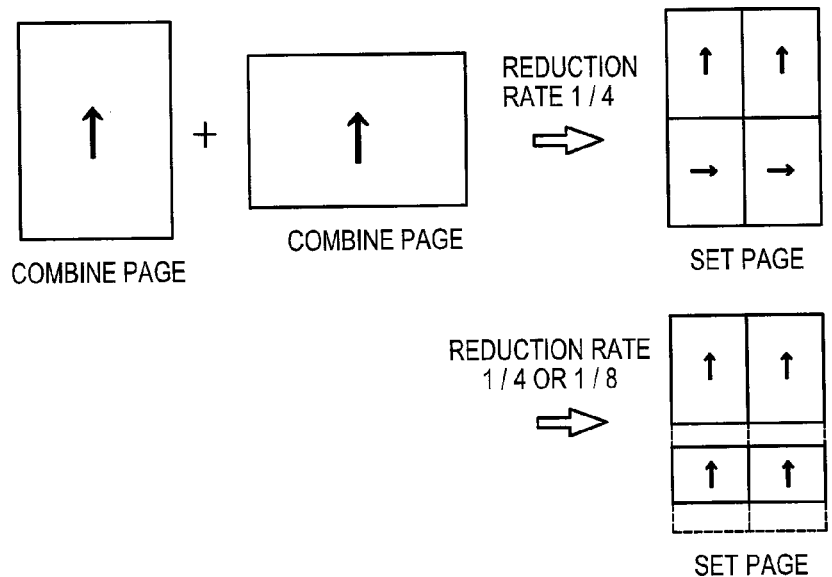
FIG. 4C is an explanation diagram of a former reduction rate calculation means.

As shown by FIG. 4C, in the case that the portrait and the landscape are intermingled in the direction of the combine pages that are arranged in one sheet of set page, by serving the reduction rate of all the combine pages of the set page as ¼, the direction of the combine pages on the set page is arranged but is not adjusted, or the direction of the combine pages on the set page is adjusted and arranged by raising the reduction rate in which the combine page is landscape. At this time, because there are combine pages in which the direction on one sheet of the set page is not adjusted, or image is reduced according to the reduction rate ¼, there is a problem that the readability of any one becomes low.

Next, it is to explain a reduction rate calculation section of the present embodiment by referring to FIG. 5. The arrow in FIG. 5 represents a direction of the combine pages similarly to FIG. 4.

Figure 5A:
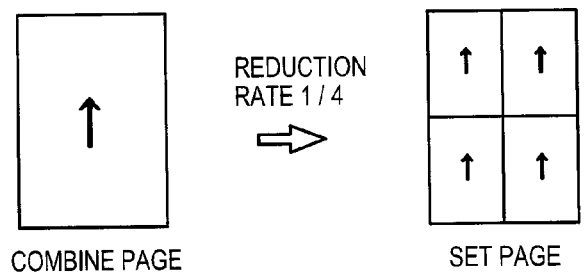
FIG. 5A is an explanation diagram of reduction rate calculation section of an image generating and processing section of print control apparatus in a first embodiment of the present invention.

As shown by FIG. 5A, when the direction of all the combine pages that are arranged in one sheet of set page is landscape, by serving the reduction rate of the combine page as ¼, it is possible to arrange by adjusting the direction of all the combine pages on the set page. At this time, there is no change compared with the former reduction rate calculation means consequently.

Figure 5B:
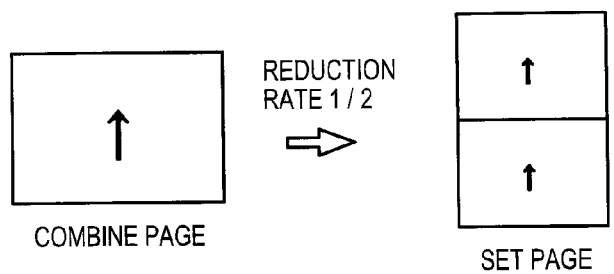
FIG. 5B is an explanation diagram of reduction rate calculation section of an image generating and processing section of print control apparatus in a first embodiment of the present invention.

As shown by FIG. 5B, when the direction of all the combine pages that are arranged in one sheet of set page is landscape, if it is rotated 90° by serving the reduction rate of the combine page as ½, it is possible to arrange by adjusting the direction of all the combine pages on the set page. Furthermore, in the former, in the case that the set pages of the front and back are the pages shown by FIG. 5A, the direction of the combine pages is different in every set page, but in the reduction rate calculation section of the present embodiment, the direction of the combine pages is adjusted even in every set page.

Figure 5C:
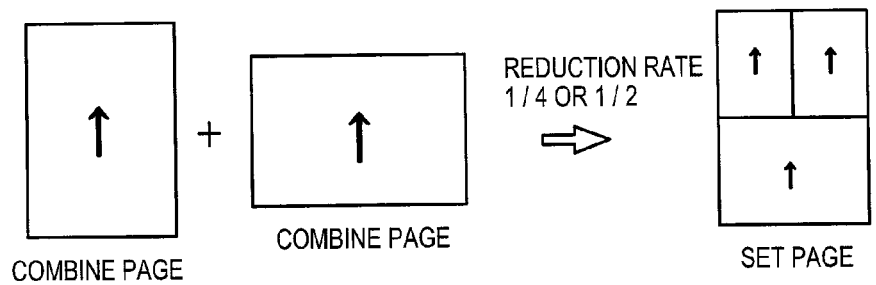
FIG. 5C is an explanation diagram of reduction rate calculation section of an image generating and processing section of print control apparatus in a first embodiment of the present invention.

As shown by FIG. 5C, in the case that the portrait and the landscape are intermingled in the direction of the combine pages that are arranged in one sheet of set page, by serving the reduction rate of the combine pages in which the direction of the combine pages is portrait as ¼, and by serving the reduction rate of the combine pages in which the direction of the combine pages is landscape as ½, it is possible to arrange by adjusting the direction of all the combine pages on the set page. At this time, there is no image in which the direction is not adjusted on one sheet of set page; on the other hand, because image is further reduced according to the reduction rate ¼, so there is a problem that the readability is low.

In the Step S2 as stated above, in the case that the direction of the combine pages and the set page are the same, the reduction rate of the combine pages is a multiplication value of the value of a horizontal sheet number X and the value of a vertical sheet number Y in which the combine pages are arranged on the set page. In the case that the direction of the combine pages and the set page are different, the reduction rate of the combine pages is served as twice of the reduction rate that is calculated according to the multiplication of X and Y.

However, the reduction rate calculation is not limited to this in the present embodiment. In the present embodiment, it is to explain a case in which the combine pages are portrait, but of course, it can also be applied to a case in which the combine pages are landscape.

Further, in the present embodiment form, as a matter of convenience of explanation, it is to explain by supposing that manuscript size of the image data 21 is the same as manuscript size of print data, therefore the reduction rate as mentioned above becomes to be calculated. However, it can be applied by adjusting the reduction rate suitably when manuscript size of the image data 21 is different from manuscript size of print data.

Further, in the present embodiment form, it is supposed that it is a A size which is an international standard size and it is a B size which is an domestic standard size as size of paper used in the print apparatus 3, and the reduction rate is calculated as mentioned above because the vertical and horizontal rate of the paper is a silver rate. However, in the case that user selects paper that is not standard, it can be applied by adjusting the reduction rate suitably.

Figure 5D:
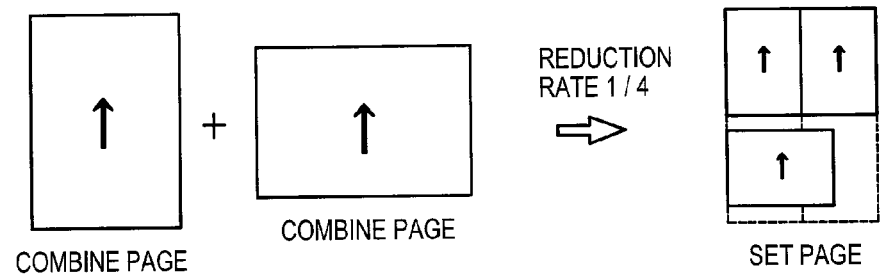
FIG. 5D is an explanation diagram of reduction rate calculation section of an image generating and processing section of print control apparatus in a first embodiment of the present invention.

Further, in the present embodiment, in the case that the direction of the combine pages is different from the set page concerning the readability, the reduction rate of the combine pages is served as twice of the reduction rate that is calculated according to the multiplication of X and Y. However, it may also be made to rotate only 90° without changing the reduction rate as shown by FIG. 5D.

(Step S3)

The image forming and processing section 120 generates combine pages from the image data 21 through the combine page drawing buffer (first storing section) 221 (referring to FIG. 1) on the basis of the selected reduction rate.

Next, the image forming and processing section 120 stores the generated combine pages in the combine page storing buffer (second storing section) 222, and stores the address of the combine pages in the combine page storing buffer pointer table 223 into the storing section 20. The combine pages of the combine page drawing buffer (first storing section) 221 are deleted after the corresponding combine pages are transferred to the combine page storing buffer 222.

(Step S4~Step S10)

The set page generation section 130 calls the arrangement data calculation section 131, and performs a process that calculates arrangement positions of respective combine pages on the set page through Step S4~Step S10. Next, it is to explain a process from Step S4~Step S10 by referring to FIG. 2~FIG. 6.

Figure 6A:
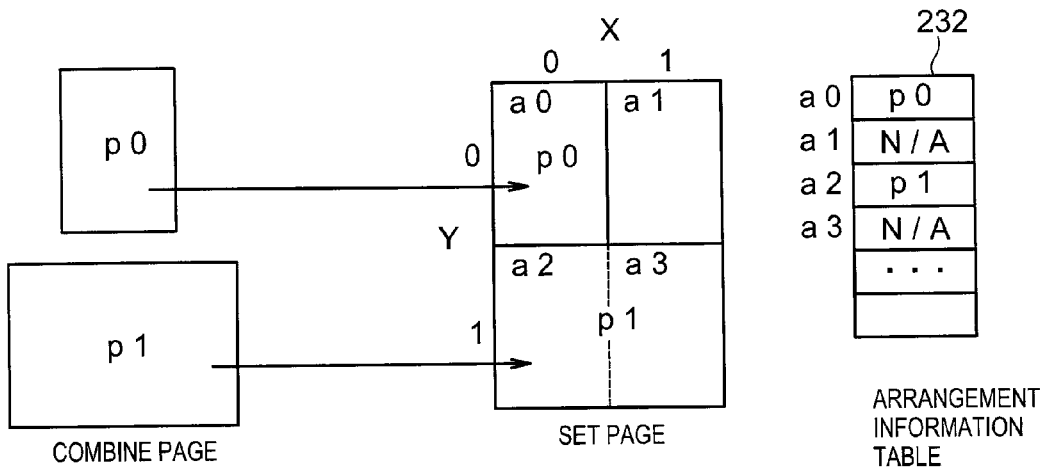
FIG. 6A is an explanation diagram of a process that calculates an arrangement position of respective combine pages on a set page of an arrangement data calculation section of print control apparatus in a first embodiment of the present invention.
Figure 6B:
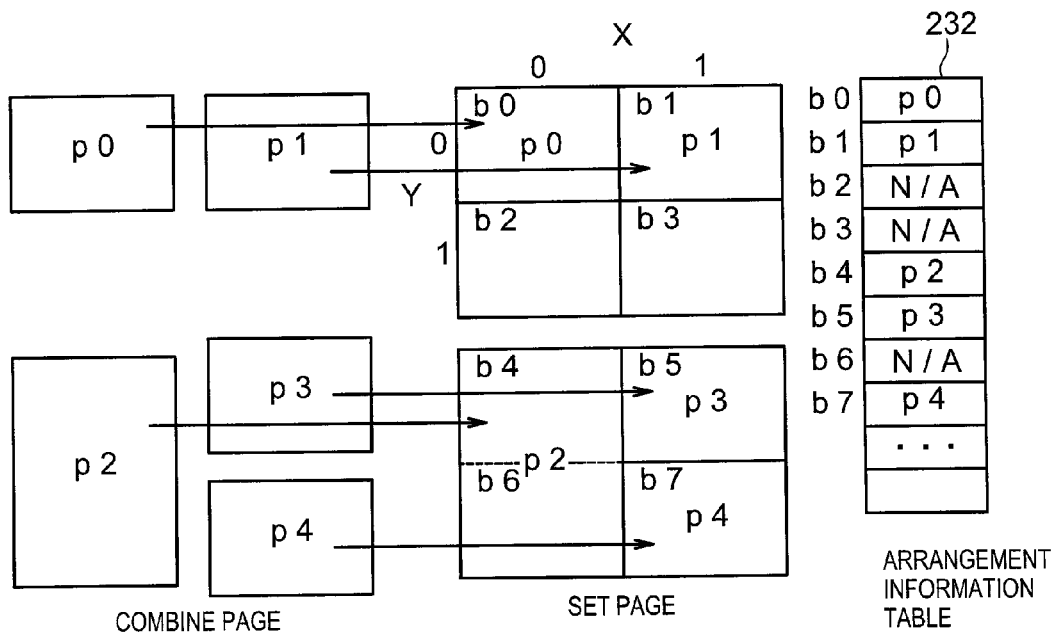
FIG. 6B is an explanation diagram of a process that calculates an arrangement position of respective combine pages on a set page of an arrangement data calculation section of print control apparatus in a first embodiment of the present invention.

The set page shown by FIG. 6A is a portrait of 4-up; and the set page shown by FIG. 6B is a landscape of 4-up.

Further, data, that is stored in a0 number of the arrangement information table 232 shown by FIG. 6A, corresponds to a page arrangement region with X=0 and Y=0 of the set page. Data, that is stored in a1 number of the arrangement information table 232, corresponds to a page arrangement region with X=1 and Y=0 of the set page; a2 number of the arrangement information table 232 corresponds to X=0 and Y=1; and a3 number of the arrangement information table 232 corresponds to X=1 and Y=1. FIG. 6B is similar to FIG.

6A. Moreover, b4~b7 of the arrangement information table 232 in FIG. 6B represent page arrangement regions of the set page of the second page.

Further, the combine page with the page number p0 in FIG. 6A is portrait of the reduction rate ¼; and the combine page with the page number p1 in FIG. 6A is landscape of the reduction rate ½. The combine pages with the page numbers p0, p1, p3 and p4 in FIG. 6B are landscape of the reduction rate ¼; and the combine page with the page number p2 in FIG. 6B is portrait of the reduction rate ¼. Respective combine pages are generated according to Step S2~Step S3 from the image data 21 that is not shown by FIG. 6 and that has the same page number of the combine pages. Moreover, the page number represents an order of an arrangement in the set page.

(Step S4)

In the Step S4, the arrangement data calculation section 131 judges whether or not two page arrangement regions are necessary for arranging the combine pages.

Concretely, in the reduction rate selection scene display section 110, because a reduction rate is selected according to the direction of the set page and the combine pages, and the combine pages whose direction is different from the set page serves the reduction rate as ½, the combine pages do not fit in one page arrangement region on the set page. Therefore, it is necessary to arrange one sheet of combine page in two page arrangement regions.

In the case that the combine page is capable of being arranged in one page arrangement region, Step S5 is advanced (Step S4 "No"); and in the case that the combine page is arranged in two page arrangement regions, Step S7 is advanced (Step S4 "Yes").

(Step S5)

The arrangement data calculation section 131 stores a page number of the combine pages in the arrangement information table 232.

In FIG. 6A, the page number p0 of the combine pages is stored in the page arrangement region a0 of the arrangement information table 232.

In FIG. 6B, the page number p0 of the combine pages is stored in the page arrangement region b0 of the arrangement information table 232.

(Step S6)

The arrangement data calculation section 131, in the case that the generation of one sheet of set page is completed or the arrangement of all combine page part is completed (Step S6 "Yes"), advances to Step S11; and in the case that the arrangement of the combine pages is still possible in one sheet of set page (Step S6 "No"), returns to the Step S2.

In FIG. 6A, the arrangement data calculation section 131 returns to the Step S2 because the arrangement is still possible in a1~a3 of the set page. Because the second sheet of image data p1 in FIG. 6A is different from the set page in direction, the reduction rate ½ is selected in Step S2, and combine page p1 is generated in Step S3; because it is arranged in two page arrangement regions in the judgment of Step S4, Step S7 is advanced.

In FIG. 6B, the arrangement data calculation section 131 returns to the Step S2 because the arrangement is still possible in b1~b3 of the set page. Because the second sheet of image data p1 in FIG. 6B is the same as the set page in direction, the reduction rate ¼ is selected in Step S2, and combine page p1 is generated in Step S3; because it is arranged in one page arrangement region in the judgment of Step S4, Step S7 is advanced, and the page number p1 of the set page is stored in the page arrangement region b1 of the arrangement information table 232.

Next, because the arrangement is still possible in b2 and b3 of the set page, Step S2 is returned. Because the third sheet of image data p2 in FIG. 6B is different from the set page in direction, the reduction rate ½ is selected in Step S2, and combine page p2 is generated in Step S3; because it is arranged in two page arrangement regions in the judgment of Step S4, Step S7 is advanced.

(Step S7)

In the Step S7, because there is a case in which the combine pages do not fit in the set page according to the arrangement position in the case that combine pages of one page are arranged in two page arrangement regions, the arrangement data calculation section 131 performs a judgment whether or not the combine pages fits to the set page. When it fits, Step S9 is advanced (Step S7 "Yes"); when it does not fit, Step S8 is advanced (Step S7 "No").

In FIG. 6A, because the combine pages do not fit if the combine page p1 is arranged in the page arrangement region a1, Step S8 is advanced.

In FIG. 6B, because the combine pages do not fit if the combine page p2 is arranged in the page arrangement region b2, Step S8 is advanced.

(Step S8)

When the combine pages cannot be arranged in a page arrangement region, it is necessary to arrange the combine pages in the other page arrangement region. The arrangement data calculation section 131, in Step S8, searches for a page arrangement region capable of arranging the combine pages. Concretely, the table writing position of the arrangement information table 232 is advanced to next page arrangement region.

In FIG. 6A, the arrangement data calculation section 131, because the combine page p1 cannot be arranged to page arrangement region a1, shifts an arrangement position, and arranges it to page arrangement region a2. Because page arrangement region a3 exists in the right side of the page arrangement region a2, the combine page p1 can be arranged to two page arrangement regions of the page arrangement regions a2 and a3. Therefore, the writing position to the arrangement information table 232 of the combine page p1 is decided into a2.

In FIG. 6B, the arrangement data calculation section 131, because the combine page p2 cannot be arranged to page arrangement region b2, shifts an arrangement position, and tries an arrangement to page arrangement region b3. However, because there is also no page arrangement region in the lower part of the page arrangement region b3, an arrangement position is shifted to page arrangement region b4 of the next set page. Here, because the arrangement of one sheet of set page is completed, after a process of Step S9, Step S10, Step S11 and Step S12 that are mentioned later is performed by leaving out Step S8 once, S2 is advanced in the judgment of Step S13 (hereinafter: set page process of the first page). Then, by passing the process of Steps S2, S3 and S4, the judgment of Step S7 is performed. In the Step S7, because page arrangement region b6 exists in the lower side of the page arrangement region b4, the arrangement data calculation section 131 can arrange the combine page p2 to two page arrangement regions of the page arrangement regions b4 and b6. Therefore, Step S9 is advanced (hereinafter: set page process of the second page).

(Step S9)

The arrangement data calculation section 131 stores a page number of the combine pages in the arrangement information table 232. The process of Step S9 is the same as the process of Step S5.

In FIG. 6A, the arrangement data calculation section 131 stores the page number p1 of the combine pages in the page arrangement region a2 of the arrangement information table 232. Here, the process about the page arrangement region a3 of the arrangement information table 232 is performed in Step S10.

In FIG. 6B, the arrangement data calculation section 131 stores the page number p2 of the combine pages in the page arrangement region b4 of the arrangement information table 232. Here, the process about the page arrangement region b4 of the arrangement information table 232 is performed in Step S10.

(Step S10)

The arrangement data calculation section 131 records page number N/A representing arrangement completion in a page arrangement region that exists ahead of the writing position of the arrangement information table 232 stored in Step S9 and that does not arrange other combine page, and in a page arrangement region except the writing position in the case that one sheet of combine page is arranged in two page arrangement regions.

For example, in FIG. 6A, the arrangement data calculation section 131 records a N/A in the page arrangement region a1 ahead of the writing position of the arrangement information table 232. Further, the arrangement data calculation section 131 records a N/A in the page arrangement region a3 except the writing position in the case that one sheet of combine page is arranged in two page arrangement regions.

Then, because one sheet of set page is completed, Step S11 is advanced (Step S6 "Yes").

In FIG. 6B, in the case to process the set page of the first page, the N/A is recorded in the page arrangement regions b2 and b3 ahead of the writing position of the arrangement information table 232. Then, because the generation of one sheet of set page is completed, Step S11 is advanced (Step S6 "Yes").

Further, in the case to process the second page of the set page, the N/A is recorded in the page arrangement region b6 except the writing position in the case that one sheet of combine page is arranged in two page arrangement regions. Here, because the generation of one sheet of set page is completed, the process returns to Step S2, p3 is arranged to the page arrangement region b5 of the arrangement information table 232, p4 is arranged to the page arrangement region b7, and Step S11 is advanced by making the process of the set page of the second page complete (Step S6 "Yes").

In the Step S10 as stated above, by recording the page number N/A representing arrangement completion in the page arrangement region that exists ahead of the writing position of the stored arrangement information table 232 and that does not arrange other combine page, the region is not used.

However, the process is not limited to this in the present embodiment. It may also arrange other combine page in the page arrangement region that exists ahead of the writing position. Concretely, it may also arrange other combine page in the page arrangement region a1 of FIG. 6A. Thus, it is possible to save paper in the print apparatus 3. Further, it is not limited to the inside of the same set page; it may also arrange other combine page by extending over a plurality of pages. Concretely, after it is arranged in b4 and b6 of the second page of FIG. 6B, it may also arrange the combine page in b2 and b3 by returning to the first page.

(Step S11)

The set page generation section 130, by using the arrangement information table 232 and the combine page storing buffer pointer table 223, takes out respective combine pages that forms set page from the combine page storing buffer (second storing section) 222, and generates a set page as arrangement image data in the set page buffer 231.

(Step S12)

The print output section 140 sends the set page as print data to the print apparatus 3 through the communicating section 50.

(Step S13)

The set page generation section 130 completes the process if the process of all the combine pages is completed (Step S13 "Yes"); returns to Step S2 if the process of all the combine pages is not completed (Step S13 "No").

Effect of Print Control Apparatus 2 in Embodiment 1

The print control apparatus 2 in the first embodiment, when N-up print is performed, can adjust arrangement position of combine pages without changing the direction of the combine pages and raising reduction rate even if pages of the portrait and the landscape are intermingled in a print document, therefore it is possible to perform N-up print without lowering the readability.

Print System in Embodiment 2

Figure 7:
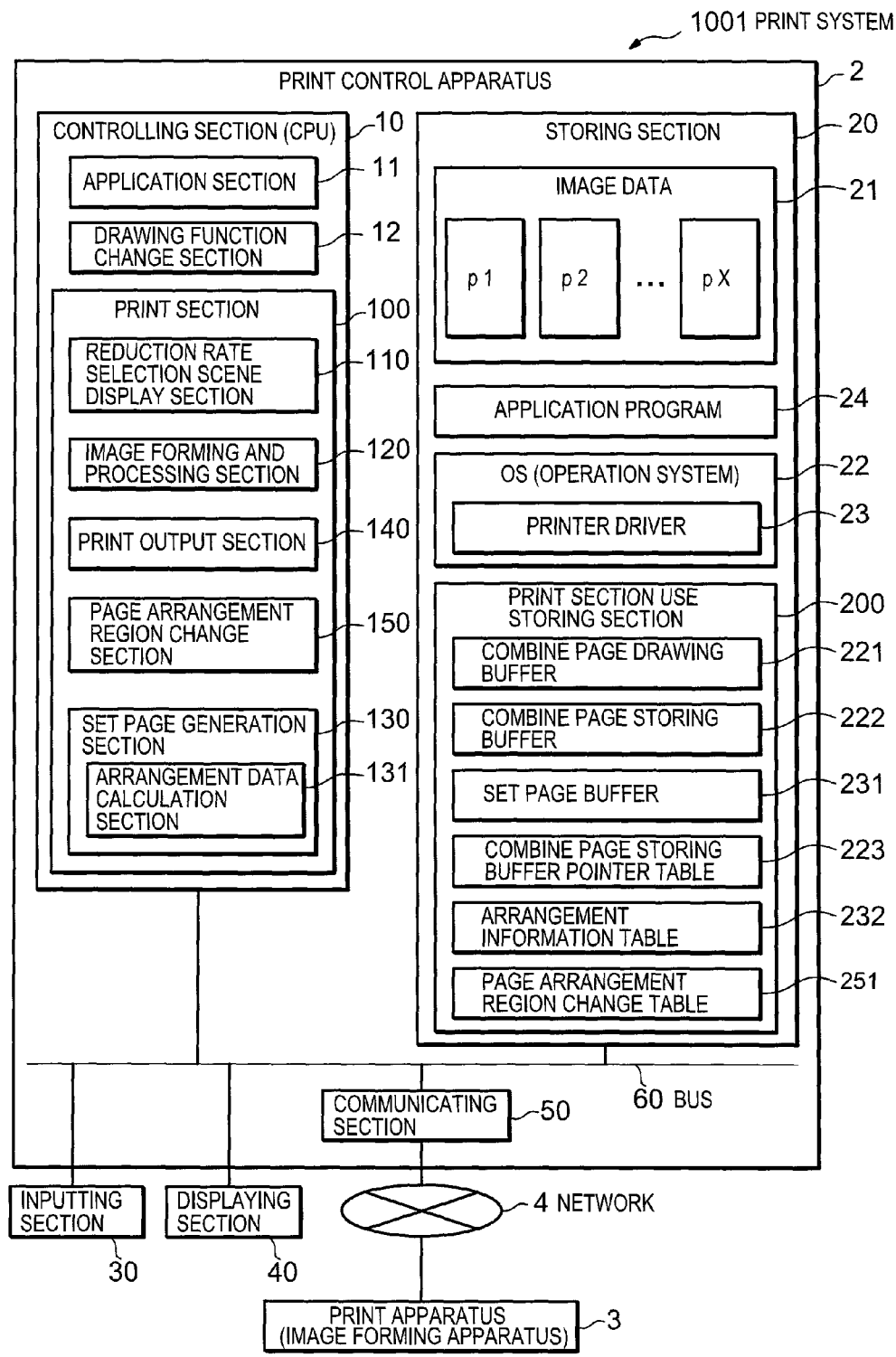
FIG. 7 is a structural diagram showing a print system in a second embodiment of the present invention.

FIG. 7 is a structural diagram showing a print system 1001 in a second embodiment of the present invention. The main difference between the print system 1 in the first embodiment of the present invention is a point that a page arrangement region change section 150 is added to the print section 100 of the print control apparatus 2, and is a point that a page arrangement region change table 251 is added to the print section use storing section 200. With respect to the parts of the same function as the first embodiment, the same signs are given, and the explanation of them is omitted.

In the first embodiment, because one page of the combine pages is arranged in two page arrangement regions of the set page in the case that the direction between the set page and the combine pages is different, there is a problem that the larger the rate on the set page of the combine pages that are different from the set page in direction becomes rather than the rate on the set page of the combine pages that are the same as the set page in direction, the fewer the combine pages capable of arranging in one page of set page becomes.

The second embodiment is characterized by that the page arrangement region change section 150, in the case that the rates on the set page of the combine pages that is different from the set page in direction is big, changes the allotment to the page arrangement region on the set page of the combine pages through changing page arrangement region on the set page.

Operation of Print Control Apparatus 2 in Embodiment 2

Figure 8:
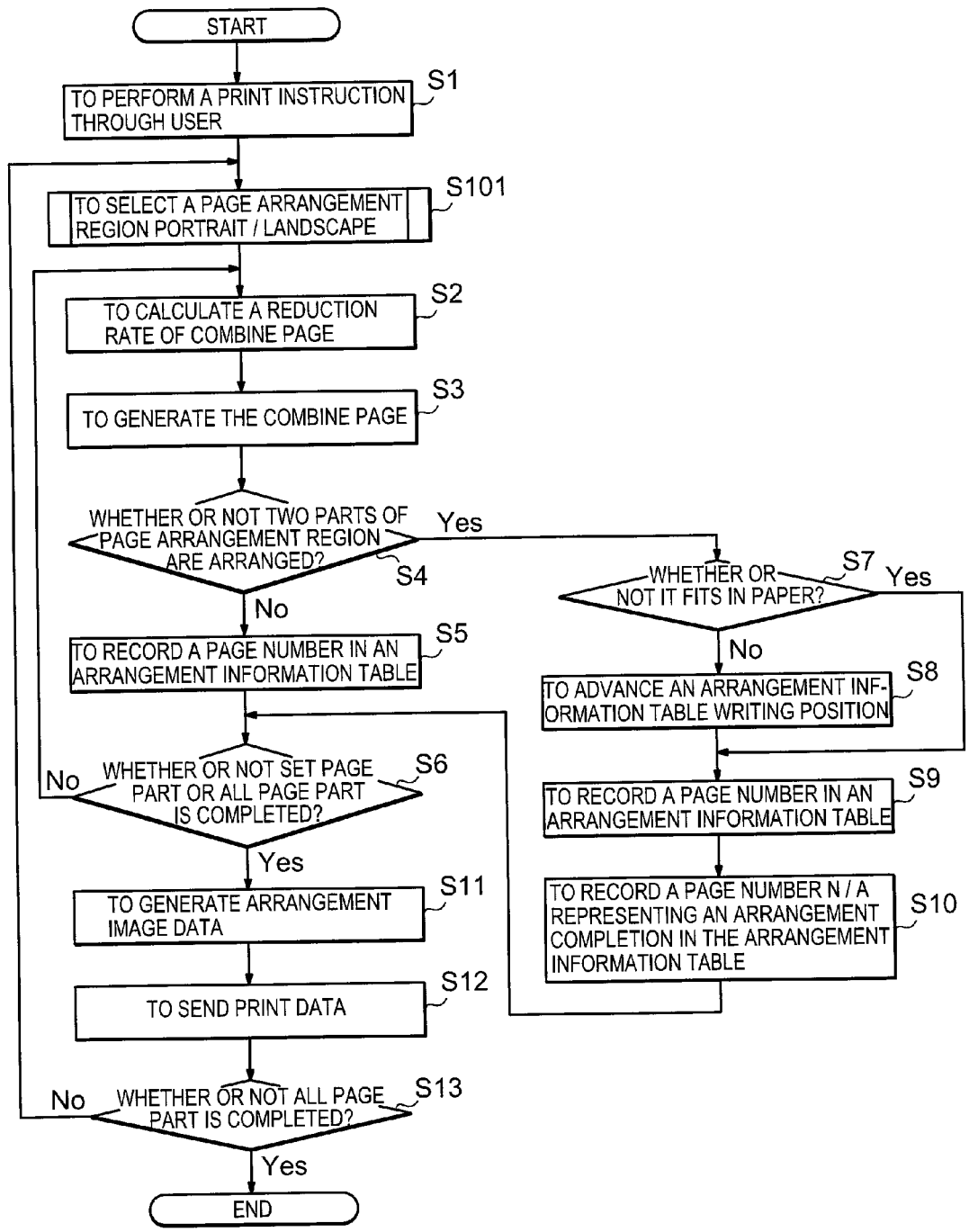
FIG. 8 is a flow chart for explaining operation of a print control apparatus in a second embodiment of the present invention.

FIG. 8 is a flow chart for explaining operation of a print control apparatus 2 in a second embodiment of the present invention. The difference between FIG. 2 that is a flow chart for explaining operation of a print control apparatus 2 in a first embodiment and FIG. 8 that is a flow chart for explaining operation of a print control apparatus 2 in a second embodiment, is a point in which Step S101 is added through the page arrangement region change section 150 in the intermediate of Step S1 and Step S2 of FIG. 8, and is a point that returns to Step S101 when it is judged "No" in Step S13 with an addition of Step S101.

Here, firstly, it is to explain a function supplied by the page arrangement region change section 150 through referring to FIG. 9. FIG. 9 is a diagram showing a relation between a direction of a combine page and a direction of a page arrangement region in set page, which becomes a basis of the page arrangement region change table 251 shown by FIG. 7.

Figure 9A:
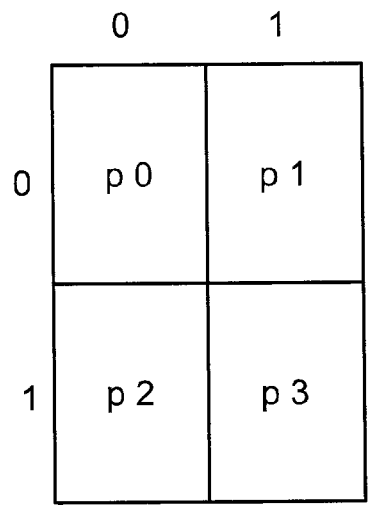
FIG. 9A is a diagram showing a relation between a direction of a combine page and a direction of a page arrangement region in set page.

FIG. 9A shows a set page of 4-up in a portrait. Usually, in the case that the set page is portrait, the page arrangement region also becomes portrait as shown by FIG. 9A.

Here, it is supposed to arrange three sheets of combine pages of landscape on the set page of 4-up in the portrait of FIG. 9A.

The print control apparatus 2 in the first embodiment arranges the first sheet of combine page in page arrangement regions p0 and p1 those are shown by FIG. 9A, arranges the second sheet of combine page in page arrangement regions p2 and p3, and arranges the third sheet of combine page in page arrangement regions p0 and p1. Therefore, in the print control apparatus 2 of the first embodiment, two sheets of set page are needed with respect to three sheets of combine pages. Moreover, the reduction rate of the combine pages is ½.

Figure 9B:
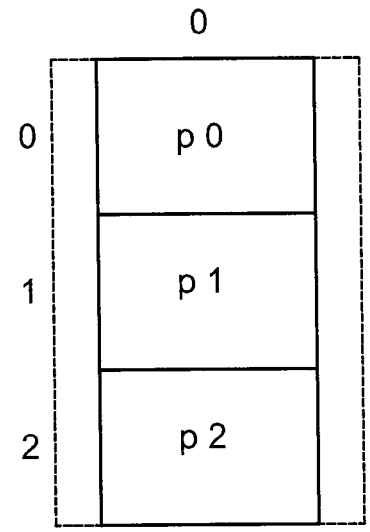
FIG. 9B is a diagram showing a relation between a direction of a combine page and a direction of a page arrangement region in set page.

Here, if the combine pages are arranged in the set page after changing the page arrangement region on the set page from 4-up in portrait shown by FIG. 9A into 3-up in landscape shown by FIG. 9B, it is possible to arrange the first sheet of combine page in the page arrangement region p0 shown by FIG. 9B, to arrange the second sheet of combine page in the page arrangement region p1, and to arrange the third sheet of combine page in the page arrangement region 2. That is, it is possible to fit three sheets of combine pages to one sheet of set page. Moreover, the reduction rate of the combine pages is ⅔. Like this, it is possible to arrange combine pages in set page efficiently without changing reduction rate largely.

Figure 9C:
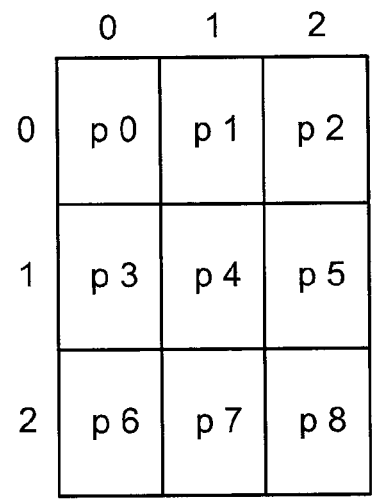
FIG. 9C is a diagram showing a relation between a direction of a combine page and a direction of a page arrangement region in set page.
Figure 9D:
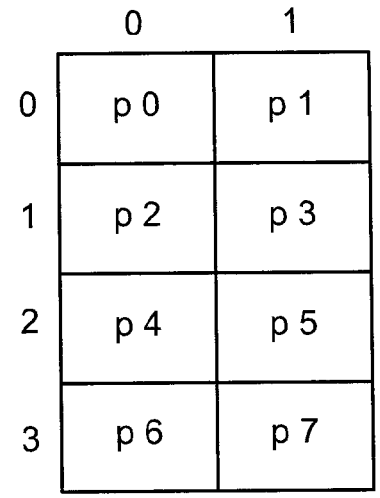
FIG. 9D is a diagram showing a relation between a direction of a combine page and a direction of a page arrangement region in set page.

Similarly, in the case that previously designated reduction rate is ⅑ as shown by FIG. 9C (set page of 9-up in portrait) and that most of the combine pages arranged in page arrangement regions p0~p8 are landscape, it would be better to select a page arrangement region in landscape of reduction rate ⅛ as shown by FIG. 9D.

In the case that previously designated reduction rate is 1/16 as shown by FIG. 9E (set page of 16-up in portrait) and that most of the combine pages arranged in page arrangement regions p0~p15 are landscape, it would be better to select a page arrangement region in landscape of reduction rate 1/18 as shown by FIG. 9F.

The page arrangement region change section 150, as stated above, comprises a corresponding relation of FIG. 9A and FIG. 9B, FIG. 9C and FIG. 9D, FIG. 9E and FIG. 9F as the page arrangement region change table 251. Then, with the rate of the combine pages, it is decided whether to serve the arrangement region as portrait that is shown by FIG. 9A, FIG. 9C or FIG. 9E, or to serve the arrangement region as landscape that is shown by FIG. 9B, FIG. 9D or FIG. 9F.

However, the page arrangement region change table 251 provided by the page arrangement region change section 150 in the present embodiment is not limited to those shown by FIG. 9. For example, the corresponding relation shown by FIG. 9 may also be other table, further, it would be better to enable user to designate a corresponding relation.

Figure 10:
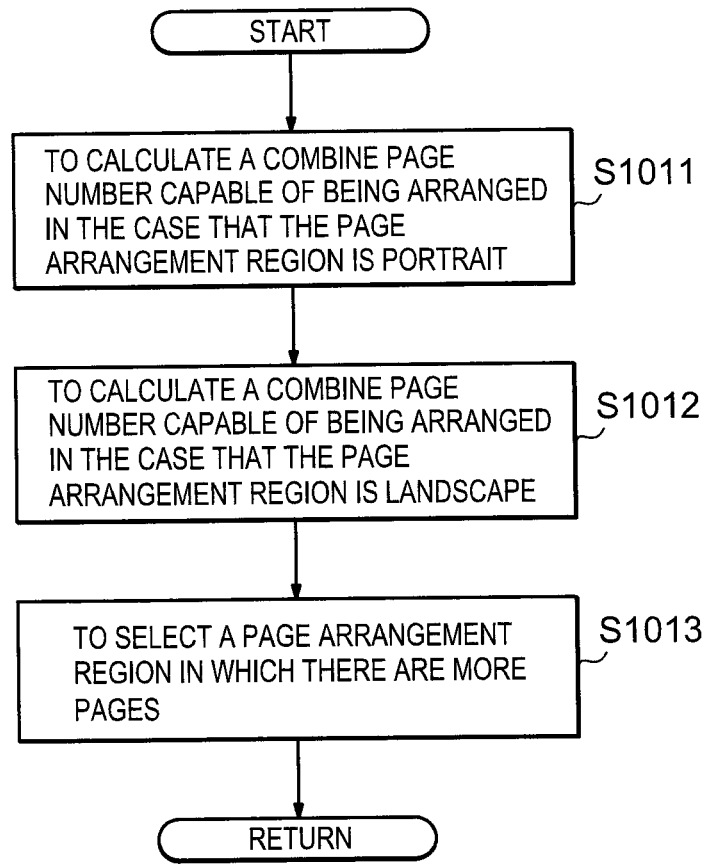
FIG. 10 is an explanation diagram of a page arrangement region change section of a page arrangement region change section of print control apparatus in a second embodiment of the present invention.

Next, it is to explain a process of Step S101 of FIG. 8 by referring to FIG. 10.

Similarly to the process in the first embodiment of FIG. 2, in the case to perform a print instruction by user, the reduction rate selection scene display section 110 displays the selection scene 400 shown by FIG. 3 on the displaying section 40, and makes user select the horizontal sheet number and the vertical sheet number of the combine pages that are arranged in the set page, and the direction of print data. At this time, through making user further check a page arrangement region automatic change check box 404, the process of the page arrangement region change section 150 is performed in Step S101.

Here, the page arrangement region change section 150 previously comprises the page arrangement region change table 251 representing a corresponding relation of FIG. 9A and FIG. 9B, FIG. 9C and FIG. 9D, FIG. 9E and FIG. 9F.

(Step S1011)

The page arrangement region change section 150 calculates a combine page number capable of being arranged in one page of set page in the case that the page arrangement region is portrait. If user selects portrait as a direction of print data, the combine page number is calculated by using the page arrangement region selected by user. On the other hand, if user selects landscape, the combine page number is calculated by using the page arrangement region according to the page arrangement region change table 251.

(Step S1012)

The page arrangement region change section 150 calculates a combine page number capable of being arranged in one page of set page in the case that the page arrangement region is landscape. If user selects landscape as a direction of print data, the combine page number is calculated by using the page arrangement region selected by user. On the other hand, if user selects portrait, the combine page number is calculated by using the page arrangement region according to the page arrangement region change table 251.

(Step S1013)

The page arrangement region change section 150, by comparing the combine page number capable of being arranged in the case that the page arrangement region calculated in Step S1011 is portrait, with the combine page number capable of being arranged in the case that the page arrangement region calculated in Step S1012 is landscape, selects a page arrangement region in which there are more combine pages in one page of the set page.

Thus, the process of S101 is completed through the page arrangement region change section 150, and Step S2 is advanced.

The following process is the same as the first embodiment. However, because the selection process of the page arrangement region is performed for every set page in Step S101, when it is judged No in Step S6 and Step S13, the advance position is different.

Effect of Print Control Apparatus 2 in Embodiment 2

The print control apparatus 2 in the second embodiment, by comparing the combine page number capable of being arranged in the case that the page arrangement region is portrait, with the combine page number capable of being arranged in the case that the page arrangement region is landscape, and selecting a page arrangement region in which there are more combine pages capable of being arranged, can reduce pages that change reduction rate, and can arrange pages efficiently, such effect is obtained as a waste of print paper is decreased.

Change Example of the Print System in Embodiment 1 and Embodiment 2

In the first embodiment and the second embodiment, a structure that comprises the print section 100 and the print section use storing section 200 in the print control apparatus 2 is adopted, but it may also comprises the print section 100 and the print section use storing section 200 in the print apparatus 3 shown by FIG. 1 or FIG. 7.

Here, the reduction rate selection scene display section 110 in the print section 100 may not always be comprised in the print apparatus 3. That is, the value of the vertical sheet number and the horizontal sheet number of the combine pages that are arranged in the set page may also be obtained in other input means.

As the input means, for example, the print apparatus 3 may receive source data for forming image through the network 4, or it may be possible to make user select by establishing a button for selecting a up number in the print apparatus 3.

Further, the print apparatus 3 comprises an image forming means that forms an image of set page on a medium. Both of the image forming means and the medium are different according to the kinds of the print apparatus 3. For example, if it is a printer, it becomes an image forming means that uses LED, laser and the like, and paper is used as a medium.

The present invention is not limited to the foregoing embodiments but many modifications and variations are possible within the spirit and scope of the appended claims of the invention.

What is claimed is:

1. An information processing apparatus allowing a printing apparatus to print an image of a set page made of a plurality of combine pages comprising:
    a reduction rate selection scene display section configured to display a selection scene for selecting a number of the combine pages to be arranged in the set page on a displaying section;
    an image forming and processing section configured to reduce a plurality of source images at a reduction rate based on the number of the combine pages selected through the reduction rate selection scene display section and generate the plurality of combine pages;
    a set page generation section configured to generate a set page by arranging the plurality of combine pages;
    and a print output section configured to output image information of the set page to the printing apparatus,
    wherein, when the plurality of combine pages includes a first combine page having a first orientation and a second combine page having a second orientation different than the first orientation, the set page generation section orients each combine page in a same orientation, and arranges the second combine page across two arrangement regions of the set page, each arrangement region is one region of a number of regions of the set page determined by dividing the set page by the number of combine pages selected at the reduction rate selection scene display section, the each arrangement region is equal in size.

2. The information processing apparatus according to claim 1, wherein the set page generation section adjusts a reduction ratio of the second combine page such that a size of the second combine page is larger than the size of the first combine page.

3. The information processing apparatus according to claim 2, wherein the set page generation section adjusts the reduction ratio of the second combine page such that the size of the second combine page is twice the size of the first combine page.

4. The information processing apparatus according to claim 1, wherein when the set page is in portrait orientation, when the first combine page is a portrait-oriented combine page and the second combine page is a landscape-oriented combine page, the set page generation section orients each combine page in the same orientation, arranges the landscape-oriented combine page across the two arrangement regions and arranges the portrait-oriented combine page in the arrangement region.

5. The information processing apparatus according to claim 4, wherein the set page generation section adjusts a reduction ratio of the landscape-oriented combine page such that a size of the landscape-oriented combine page is larger than a size of the portrait-oriented combine page.

6. The information processing apparatus according to claim 5, wherein the set page generation section adjusts the reduction ratio of the landscape-oriented combine page such that the size of the landscape-oriented combine page is twice the size of the portrait-oriented combine page.

7. The information processing apparatus according to claim 1, wherein the reduction rate selection scene display section displays on the selection scene a reception section accepting a selection of an N-up number when N-up printing is performed, and selects the number of the combine pages based on the N-up number accepted at the reception section.

8. An information processing method allowing a printing apparatus to print an image of a set page made of a plurality of combine pages, the method comprising the steps of:
    displaying a selection scene for selecting a number of the combine pages to be arranged in the set page on a displaying section;
    reducing a plurality of source images at a reduction rate based on the selected number of combine pages, and generating the plurality of combine pages;
    generating a set page by arranging the plurality of combine pages; and
    outputting image information of the set page to the printing apparatus,
    wherein, when the plurality of combine pages includes a first combine page having a first orientation and a second combine page having a second orientation different than the first orientation, orienting each combine page in a same orientation, and arranging the second combine page across two arrangement regions of the set page, each arrangement region is one region of a number of regions of the set page determined by dividing the set page by the selected number of the combine pages selected, the each arrangement region is equal in size.

9. The information processing method according to claim 8, further comprising adjusting a reduction ratio of the second combine page such that a size of the second combine page is larger than the size of the first combine page.

10. The information processing method according to claim 9, further comprising adjusting the reduction ratio of the second combine page such that the size of the second combine page is twice the size of the first combine page.

11. The information processing method according to claim 8, further comprising, when the set page is in portrait orientation, when the first combine page is a portrait-oriented combine page and the second combine page is a landscape-oriented combine page, orienting each combine page in the same orientation, arranging the landscape oriented combine page across the two arrangement regions, and arranging the portrait-oriented combine page in the arrangement region.

12. The information processing method according to claim 11, further comprising adjusting a reduction ratio of the landscape-oriented combine page such that a size of the landscape-oriented combine page is larger than a size of the portrait-oriented combine page.

13. The information processing method further according to claim 12 further comprising adjusting the reduction ratio of the landscape-oriented combine page such that the size of the landscape-oriented combine page is twice the size of the portrait-oriented combine page.

14. The information processing method according to claim 8, further comprising: displaying on the selection scene a reception section accepting a selection of an N-up number when N-up printing is performed, and selecting the number of the combine pages based on the N-up number accepted at the reception section.

* * * * *